United States Patent [19]

Jenne

[11] Patent Number: 6,098,708
[45] Date of Patent: Aug. 8, 2000

[54] APPARATUS FOR PULLING A PIPE INTO AN EARTH BORE

[75] Inventor: Dietmar Jenne, Strengelbach, Switzerland

[73] Assignee: Terra AG fuer Tiefbautechnik, Strengelbach, Switzerland

[21] Appl. No.: 09/050,692

[22] Filed: Mar. 30, 1998

[30] Foreign Application Priority Data

Apr. 2, 1997 [DE] Germany .................. 197 13 640

[51] Int. Cl.$^7$ ...................................... F16L 1/00
[52] U.S. Cl. ..................... 166/55.3; 175/53; 405/154
[58] Field of Search ............... 175/53; 166/55.2, 166/55.3; 405/154; 285/404, 288.1, 288.5

[56] References Cited

U.S. PATENT DOCUMENTS

| | | | |
|---|---|---|---|
| 3,888,519 | 6/1975 | Smith et al. | 285/404 |
| 4,507,019 | 3/1985 | Thompson | 166/55.3 |
| 5,302,053 | 4/1994 | Moriarty | 166/55.2 |
| 5,782,311 | 7/1998 | Wentworth | 175/53 |
| 5,785,458 | 7/1998 | Handford | 405/154 |

*Primary Examiner*—William Neuder
*Attorney, Agent, or Firm*—McCormick, Paulding & Huber LLP

[57] ABSTRACT

An apparatus for pulling a pipe (12) into an earth bore, especially for replacing a breakable supply conductor laid in the earth, includes an approximately conical displacement head having a cylindrical tubular shaft (18) connected to its large diametered rear end, the outer diameter of which shaft corresponds to the large diameter of the displacement head and the inner diameter of which shaft is larger than the outer diameter of the pipe (12) to be pulled in. Means are provided for connecting the pipe (12) to be pulled in with the shaft (18) and is in the form of at least two clips extending parallel to the axis of the shaft (18) and fixed to the end of the shaft remote from the displacement head and angularly spaced from one another. Each of the connecting clips has a radial bore for receiving a headless connecting bolt (60), and the bore and the connecting bolt are so designed that when the connecting bolt is in its inserted condition with respect to the clip, it does not extend outwardly beyond the radial outer surface (54) of the clip (52).

9 Claims, 3 Drawing Sheets

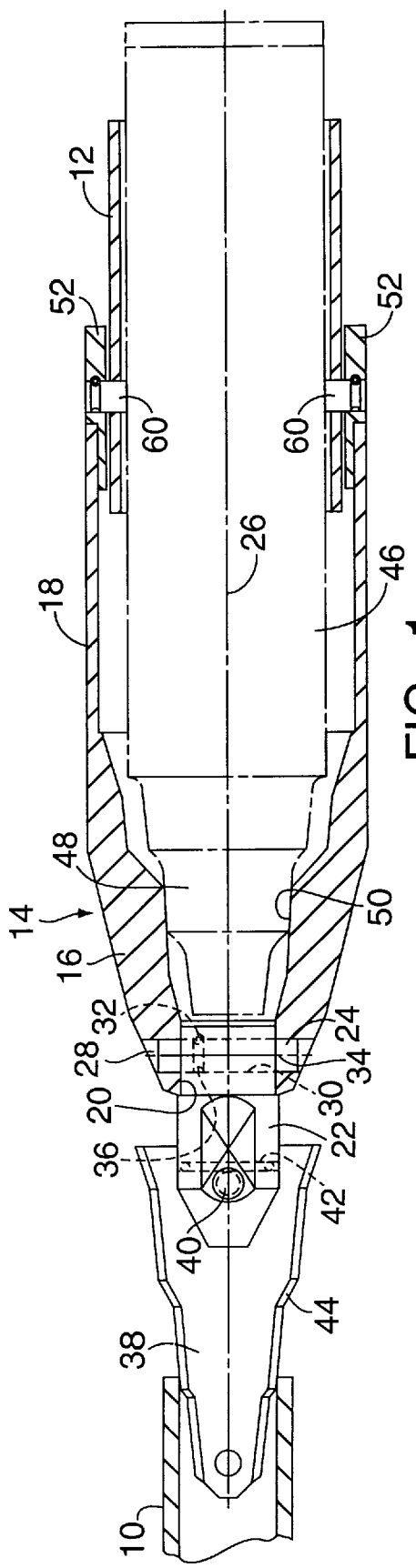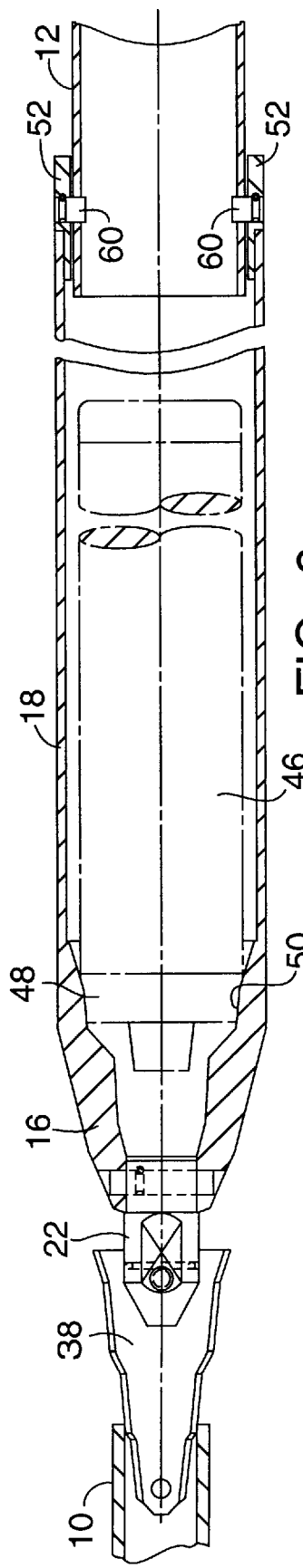

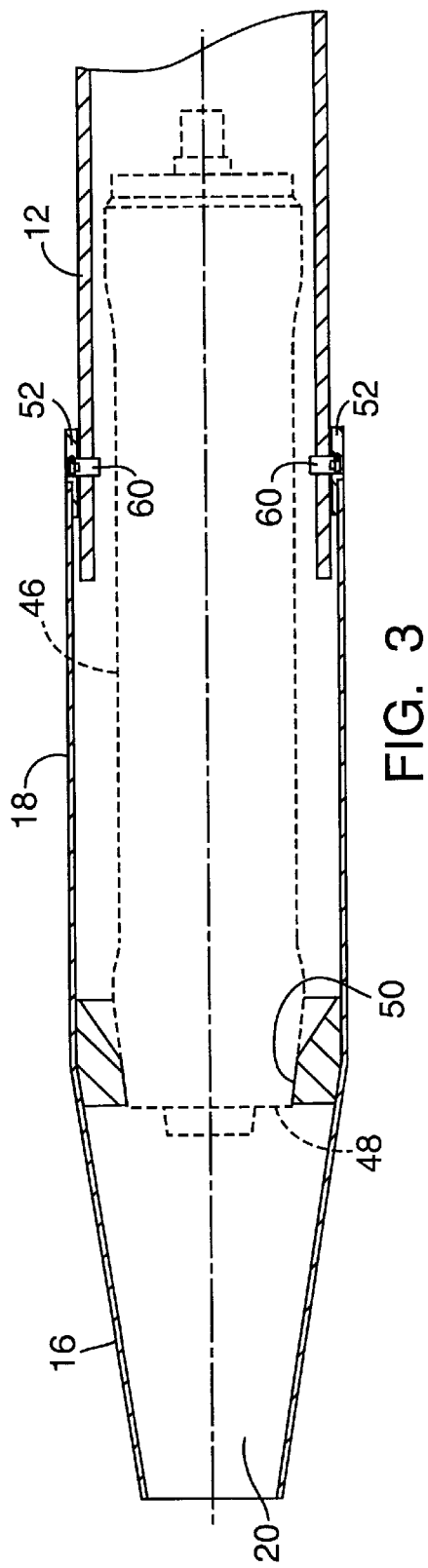
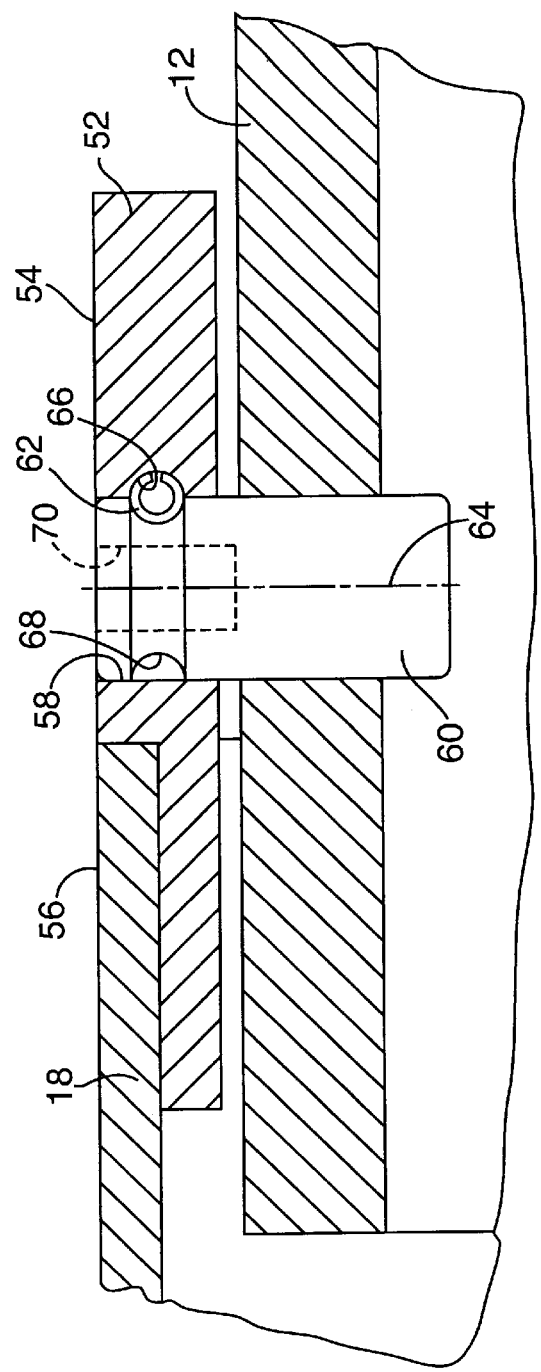

APPARATUS FOR PULLING A PIPE INTO AN EARTH BORE

FIELD OF THE INVENTION

The invention concerns an apparatus for pulling a pipe into an earth bore, especially for replacing a breakable supply conductor laid in the earth, the apparatus including an at least nearly conical displacement head having a cylindrical tube shaped shaft connected to its larger diametered rear end, the outer diameter of which shaft corresponds to the larger diameter of the displacement head and the inner diameter of the shaft being larger than the outer diameter of the pipe to be drawn in, with means being provided for connecting the pipe to be drawn in with the shaft.

BACKGROUND OF THE INVENTION

A device of the aforementioned kind is known, for example, from DE 195 27 138 C1. In the apparatus described there, the displacement head is connected at its forward end with a splitting wedge serving to break up or destroy an old and to be replaced supply conductor laid in the earth. One such splitting wedge is especially necessary if the replaced pipe is a cast pipe. These cast pipes have every four to six meters a very thick walled socket that has to be destroyed.

If the pipe to be replaced is made of cement or stone materials, such a splitting wedge is not absolutely necessary.

The displacement head, whose forward diameter is smaller than the inner diameter of the pipe to be replaced and whose rear diameter is larger than the outer diameter of the new pipe to be drawn in serves so that the broken pieces of the pipe to be replaced are pressed outwardly into the earth and so that the earth bore is so widened that the new pipe can be drawn into it.

The pipe to be drawn in is inserted at its forward end into the cylindrical shaft and in the known solution is secured by the help of bolts, which are threaded into threaded bores in the rear portion of the cylindrical shaft and are received in radial bores which pass through the pipe to be drawn in.

A disadvantage of this solution is that the cylindrical shaft is not smooth on its outside. To avoid the heads of the screwed bolts from being torn off, deflecting elements are welded onto the outer circumferential surface of the cylindrical shaft. Therefore considerable forces appear at these points when the apparatus is driven through the earth. In extreme cases, the displacement head can be torn from the cylindrical shaft.

It is further known that the new pipe can be drawn in with the help of a cable and a cable gripping apparatus which is fastened to the rear end of the new pipe and which is connected with the cable. This solution has the disadvantage that the cable stretches heavily upon being loaded in tension. In the case of a pipe to be drawn in of 100 m length, this can lead to the tension cable being elongated by about 1 m. Thereupon, the pipe to be drawn in can move out of the cylindrical shaft of the apparatus and can become jammed in the earth bore.

The invention has as its object the provision of an apparatus of the aforementioned kind with which the pipe to be drawn in can be connected with the cylindrical shaft of the apparatus in a simple way whereby the outer circumferential surface of the cylindrical shaft remains entirely smooth.

SUMMARY OF THE INVENTION

These objects are solved in accordance with the invention in that the end of the shaft remote from the displacement head has fastened to it at least two clips arranged parallel to the axis of the shaft and at an angular spacing from one another, each of which clips has a radial bore for receiving a headless connecting bolt in such way that the connecting bolt in its inserted condition does not extend outwardly beyond the radial outer surface of the clip.

In the inventive solution, the cylindrical shaft on its outer surface remains entirely smooth. The clips can be made thick enough to assure a sufficient holding of the connecting bolts. Moreover, the clips can be manufactured from a high strength material that assures that the connecting bolts cannot be torn off. This is a substantial cost effective solution when the entire cylindrical shaft must be manufactured with thick walls or from a material of high value.

The use of the clips for fastening the pipe to be drawn into the apparatus offers moreover the possibility of the connecting bolts, after their insertion into the bolt receiving clip bores, to each be secured by a bolt securing element arranged perpendicularly to the bolt axis. This in turn offers the possibility of using plug in bolts which are quick and easy to assemble and to thereafter remove. Basically, it would also naturally be possible to screw the connecting bolts into threaded bores. It has, however, been shown that the threaded bolts because of at times heavy transverse loading bind in their threads and after the drawing in of the pipe are difficult to remove.

The securing of the connecting bolts can take place in such way that in each clip a second bore is provided which cuts the bolt receiving clip bore for insertion of a bolt securing element, and in that the connecting bolt on its outer circumferential surface has a recess which after the insertion of the connecting bolt into the bolt receiving bore aligns with the second bore.

Preferably, the bolt recess is formed as a surrounding ring groove so that the connecting bolt can be inserted in any desired angular position into the bolt receiving bore. Preferably the bolt securing element is a cylindrical spring cotter hammered into the second bore and which can be thereafter hammered out by a punch.

The apparatus of the invention can be moved through the earth bore in any suitable way. Preferably however the displacement head is hollow with a conical abutment surface for the head of a pressure fluid actuated ram apparatus, so that the apparatus according to the invention together with the pipe to be drawn in is moved through the earth by means of the ram apparatus with, if need be, the pipe to be replaced also being destroyed.

In a preferred embodiment of the invention the displacement head has an axial opening at its forward end. This opening can be used for two functions. On one hand, it offers the possibility after the arrival of the inventive apparatus at the target work pit of the ram apparatus, which is gripped in the conical abutment surface, being separated from the displacement head rearwardly through the axial opening, so that the displacement head and the shaft can be more easily removed from the indrawn pipe and can be lifted from the work pit. On the other hand, the axial opening can be used for fastening a splitting wedge to the displacement head, with a third bore in a practical way being formed in the displacement head perpendicular to the axial opening to receive a securing bolt which is fixedly placeable relative to a splitting wedge adapter inserted into the axial opening. The security bolt in turn can in similar way, as described above for the connecting bolt, be secured by means of a cylindrical spring cotter pin against an unintentional loosening.

BRIEF DESCRIPTION OF THE DRAWINGS

Further features and advantages of the invention will be apparent from the following description, which in connection with the accompanying figures explain the invention in detail by way of exemplary embodiments. The drawings show:

FIG. 1 is an axis containing schematic sectional view through a device embodying the invention for replacing a breakable supply conductor laid in the earth, FIG. 2 is a view similar to FIG. 1 of an apparatus according to a second embodiment of the invention, FIG. 3 is a view similar to FIG. 1 of an apparatus according to a third embodiment of the invention for pulling a pipe into an earth bore, FIG. 4 is an axis containing sectional view in enlarged scale through the connecting area of the cylindrical shaft and of a pipe to be laid.

DETAILED DESCRIPTION OF THE PREFERRED EMBODIMENTS

Figure 5:
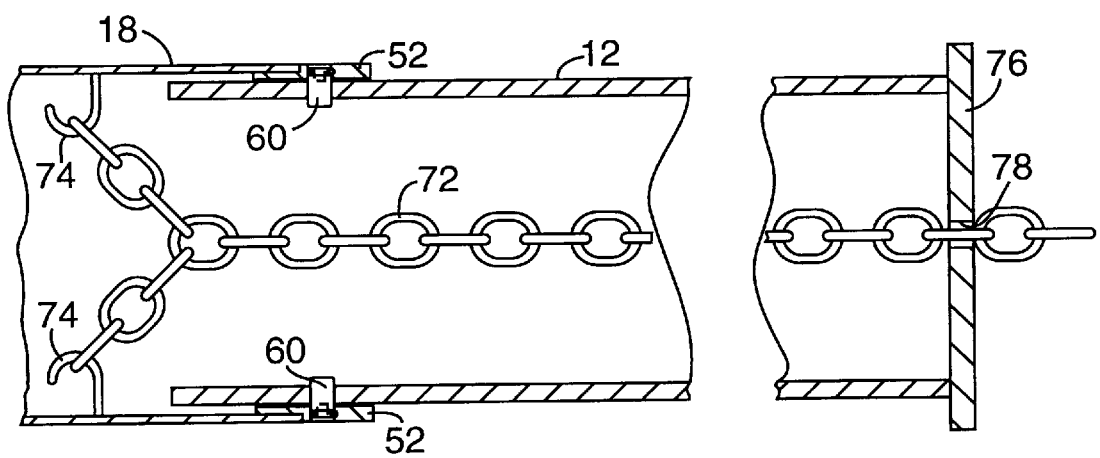
FIG. 5 is a schematic sectional view taken through the end region of the apparatus and a pipe to be laid for explaining the pulling in process.

The apparatus according to the invention for replacing a breakable supply conductor 10 laid in an earth bore with a new conductor 12 includes a splitting jacket indicated generally at 14. The splitting jacket consists of an at least nearly or approximately conical displacement head 16 and a cylindrical shaft 18 which is connected to the rearward larger diametered end of the displacement head 16. At its forward end, the displacement head 16 has an axial bore 20 in which is positioned a splitting wedge adapter 22. The splitting wedge adapter 22 is held in the bore 20 by means of a securing bolt 24 which passes through a bore 28 in the displacement head 16 oriented perpendicularly to the axis 26 of the splitting jacket 14 and a bore 30 in the splitting wedge adapter 22 aligned with the bore 28. The securing bolt 24 is held in its inserted position by a cylindrical spring cotter 32 which passes through a bore in the displacement head perpendicular to the axis 26 of the splitting jacket 14 and perpendicular to the axis 34 of the bore 28 and which received in a ring groove 36 cut into the circumferential surface of the securing bolt 24.

At its forward end, the splitting wedge adapter 22 has a non-illustrated slot in which a flat splitting wedge 36 is positioned. The splitting wedge is held in the splitting wedge adapter 22 with the help of a bolt 40, which in turn is secured in the above-described way by a cylindrical spring cotter 42.

The splitting wedge 38 has two breaking edges 44 running forwardly and inwardly toward one another and is at its forward end smaller than the diameter of the old pipe 20 to be broken up, while at its rearward end it is significantly broader than the diameter of the pipe 10, as shown in FIG. 1.

A ram apparatus 46 driven by a pressure fluid is arranged inside of the splitting jacket 14, the ram apparatus having a head portion 48 which lies on a conical abutment surface 50 on the inside of the displacement head 16. In operation, the ram apparatus 46 wedges rigidly into the displacement head 16 so that the impact energy of the ram apparatus 46 is transmitted directly to the displacement head 16 and to the splitting wedge 38.

The connection between the new pipe 12 to be drawn in and the splitting jacket 14 will now be explained in more detail, as follows in connection with FIG. 4.

To the rearward edge of the cylindrical shaft 18 of the splitting jacket 14 are welded two clips 52 located at two points diametrically opposite to one another, so that the radial outer surface 54 of each clip 52 is flush with the convex surface 56 of the cylindrical shaft 18. The clips 52 extend generally parallel to the axis 26 of the splitting jacket 14.

Each of the clips 52 has a smooth radial bore 58 into which a headless plug in bolt 60 is so far inserted that its radial outer end is flush with the surface 54 of the clip 52. The length of the plug in bolt 60 is so chosen that it extends out of the bore 58 of the clip 52 radially inwardly and passes radially through the wall of the pipe 12 to be drawn in, as shown in the figures. A cylindrical spring cotter pin 62 serves to secure the plug in or connecting bolt 60, which cotter pin 62 passes through a bore 66 in the clip 52 directed perpendicularly to the axis 64 of the plug in bolt 60 and to the axis 26 of the splitting jacket 14, with it at the same time being received in a ring groove of half circular cross sectional shape formed on the circumference of the plug bolt 60, as shown in FIG. 4. The bore 66 therefore cuts the bore 58 in the clip 52 so that the wall of the bore 58 runs through the axis of the bore 66.

The plug in bolt 60 can also have on its radially outer end an internally threaded bore 70 as indicated by the broken lines, in which a customary screw can be threaded. This makes easier the handling of the plug bolt 60 during its assembly and disassembly. This screw, it will be understood, is later removed for the actual operation of the splitting jacket.

The plug in bolt 60 has customarily a diameter of about 30 to 60 mm depending on the diameter and weight of the pipe to be drawn in. Preferably, the plug in or connecting bolt is made of high alloy steel which, above all, is not hardened. This inhibits sudden unwanted shear breaks.

At the construction site, the so far described apparatus is assembled in the following way: the ram boring device 46 is pushed into the splitting jacket 14. The force and energy confining connection between the ram device 46 and the splitting jacket 14 is accomplished through the conical surfaces 48, 50. The new pipe 12 to be drawn in is pushed from the rear to the splitting jacket 14. Following this, holes with diameters equal to those of the connecting bolts 60 are bored by a drill in the new pipe through the transverse bores 58 of the clips 52. The new pipes for this purpose as a rule are plastic pipes typically made of polyethylene. These pipes are light and also can be drilled by hand. After this, the plug in bolts 60 are assembled and secured by means of spring cotter pins 62. This assembly is capable of being carried out within a few minutes even in the case of pipes of large diameter.

Self-evidently more than two clips 52 can be provided, in which case they preferably are distributed over the circumference of the cylindrical shaft 18 at equal angular spacings from one another.

In addition to the previously described connection between the pipe 12 to be pulled in and the splitting jacket 14, a pipe to be pulled in can be fastened to the splitting jacket 14 further by means of a chain 72 (FIG. 5), which chain is fastened to inner fastening points 74 of the splitting jacket 14 and which run inside of the pipe 12 up to its rear end. At that point the chain 72 is hung onto a gripping plate 76 the outer diameter of which is larger than the diameter of the pipe 12 to be drawn in. The gripping plate 76 has a slot 78 which is somewhat wider than the thickness of a chain link. This makes possible a simple connection between the chain 72 and the gripping plate 76 in that the chain 72 can be laterally inserted by hand into the slot 78. The following chain link turned at 90° prevents the chain 72 from moving through the slot 78. The advantage of a pulling chain in comparison to the previously customarily used pulling cable lies in that the chain barely stretches.

As is to be seem from FIG. 1, the head of the ram apparatus 46 is rigidly gripped in the conical surface 50 after the pulling in procedure. To disassemble the splitting jacket 14, the splitting wedge adapter 22 is first removed from the bore 20. Through the now free lying opening, the ram apparatus 46 can be hammered rearwardly out of the conical surface 50. This greatly simplifies the disassembly of the apparatus of the invention under the spatially very cramped conditions of the target pit.

The embodiment according to FIG. 2 differs from the embodiment according to FIG. 1 essentially only by way of the length of the cylindrical shaft. This solution is to be chosen in the case of small diameter. As shown in FIG. 2, in the there illustrated solution there remains between the outer surface of the ram apparatus 14 and the inner surface of the cylindrical shaft 18 insufficient space for the new pipe to be pushed therebetween. In this case, the cylindrical shaft must therefore extend rearwardly beyond the ram apparatus 46 in order to be fastened to the new pipe. Otherwise, parts which are similar to those of the embodiment of FIG. 1 are designated by the same reference numerals.

The embodiment according to FIG. 3 in contrast is especially intended for large diameters and serves in first line for the cases in which the old conductor must not be destroyed beforehand. Here again, similar parts are indicated by similar reference numbers. As one will recognize, the displacement head is open at its forward small diametered end so that the ram apparatus 46 can easily be separated from the splitting jacket 14 through this opening. The connection between the pipe 12 to be drawn in and the splitting jacket 14 takes place in the same way as has been described in connection with FIG. 4.

I claim:

1. An apparatus for pulling a pipe (12) having a given outer diameter into an earth bore, said apparatus comprising:

an approximately conical displacement head (16) having a large diametered rear end connected with a cylindrical tubular shaft (18), said tubular shaft having an outer diameter corresponding to the large diametered rear of the displacement head (16) and said shaft having an internal diameter larger than said given outer diameter of the pipe (12) to be pulled in, and means for connecting said shaft to a said pipe (12) to be pulled in, said means for connecting including at least two clips (52) arranged parallel to the axis of said shaft and located at the end of said shaft (18) remote from said displacement head (16) at an angular spacing to one another and fixed to said shaft, each of said clips having a radial bore, a radial outer surface and a headless connecting bolt (60) receivable in said radial bore of said clip and movable between inserted and removed conditions relative to said clip, said connecting bolt (60) when in said inserted condition not extending outwardly beyond said radial outer surface (54) of the clip (52).

2. The apparatus of claim 1 wherein:

said bolt has a longitudinal axis (64), and said connecting bolt (60) after its insertion into the bolt receiving bore (58) is secured by a bolt securing element (62) oriented perpendicularly to the bolt longitudinal axis (64).

3. The apparatus of claim 2 wherein:

in each of said clips (52) a second bore (56) is provided which cuts the bolt receiving bore (58) for the insertion of a bolt securing element (62), and the connecting bolt (60) on its outer circumferential surface has a recess (68) which after the insertion of the connecting bolt (60) into the bolt receiving bore (58) aligns with the second bore (66).

4. An apparatus according to claim 3 wherein:

said recess is a circumferential ring groove (68).

5. An apparatus according to claim 2 wherein:

said bolt securing element is a spring pin (62).

6. An apparatus according to claim 1 wherein:

said displacement head (16) is hollow and has a conical abutment surface (50) for engagement with the head (48) of a pressure fluid actuated ram apparatus (46).

7. An apparatus according to claim 1 wherein:

said displacement head (16) at its small diametered forward end has an axial opening (20).

8. An apparatus according to claim 7 wherein:

a bore (28) is formed in said displacement head (16) perpendicularly to the axial opening (20) for receiving a securing bolt (24) which serves to fix to the displacement head (16) a splitting wedge adapter insertable into said axial opening (20).

9. An apparatus according to claim 1 wherein:

said apparatus further comprises a means (74) arranged on said displacement head (16) or on said shaft (18) for fastening to a pulling chain (72), and a gripping plate (76), said pulling chain (72) is made up of a number of links of a given thickness, and said gripping plate has a diameter larger than said given diameter of the pipe to be pulled in and inwardly of its outer edge has an open slot (78), the width of said slot being slightly larger than said given thickness of said links of said pulling chain (72).

* * * * *